(12) United States Patent
Auer

(10) Patent No.: US 7,013,847 B2
(45) Date of Patent: Mar. 21, 2006

(54) HEADING GAS INJECTION SYSTEM (HGIS) DIRECT INJECTION SYSTEM

(76) Inventor: Gerhard Auer, Plüddemanngasse 77/1, Graz A-8010 (AT)

( * ) Notice: Subject to any disclaimer, the term of this patent is extended or adjusted under 35 U.S.C. 154(b) by 0 days.

(21) Appl. No.: 10/499,371

(22) PCT Filed: Dec. 11, 2002

(86) PCT No.: PCT/AT02/00346

§ 371 (c)(1),
(2), (4) Date: Jun. 14, 2004

(87) PCT Pub. No.: WO03/052244

PCT Pub. Date: Jun. 26, 2003

(65) Prior Publication Data

US 2005/0066575 A1  Mar. 31, 2005

(30) Foreign Application Priority Data

Dec. 14, 2001 (AT) .............................. A 1965/2001

(51) Int. Cl.
*F02B 47/02* (2006.01)
(52) U.S. Cl. .................................................. 123/25 B
(58) Field of Classification Search .............. 123/25 R, 123/25 A, 25 B, 25 C, 25 D, 25 E, 25 F, 123/25 P; 44/639, 301
See application file for complete search history.

(56) References Cited

U.S. PATENT DOCUMENTS

| 4,909,192 A | * | 3/1990 | Forster et al. ............ 123/25 C |
| 5,582,139 A | | 12/1996 | Feuerman |
| 6,010,544 A | | 1/2000 | Haldeman et al. |
| 6,487,994 B1 | * | 12/2002 | Ahern et al. .............. 123/25 R |

FOREIGN PATENT DOCUMENTS

EP  299132 A1 *  1/1989

* cited by examiner

*Primary Examiner*—Henry C. Yuen
*Assistant Examiner*—Hyder Ali
(74) *Attorney, Agent, or Firm*—David Guerra

(57) ABSTRACT

The invention relates to a heading gas injection system (HGIS) direct injection system. The invention makes it possible to atomize fuel mixtures and fuels of all types and to directly inject them into the combustion chamber of a mixture-compressing, spark-ignition internal combustion engine of all designs. This is achieved by means of a heating element (10), a fuel injection nozzle (1) a temperature probe (5), electrical heating resistors (diodes) (2), an electromagnetic valve (3) and a pressure gauge (14). The control unit (8) is provided for controlling these individual components. This control unit (8) also has the task of ensuring that the inlet valve (4), with the flow meter (6), ensures an optimal pollutant-free and low-pollutant operation. A pollutant-free operation of an internal combustion engine can be ensured when using methanol, ethanol, water mixture, hereby signifying a zero pollutant emission.

8 Claims, 2 Drawing Sheets

HEADING GAS INJECTION SYSTEM (HGIS) DIRECT INJECTION SYSTEM

Device for gasification of a water-fuel mixture designed for combustion engines with an injection system and an integrated combustion chamber direct injection system.

BRIEF DESCRIPTION OF THE DRAWINGS

Embodiments of the invention are described in greater detail below with reference to the appended drawings, in which.

Figure 1:
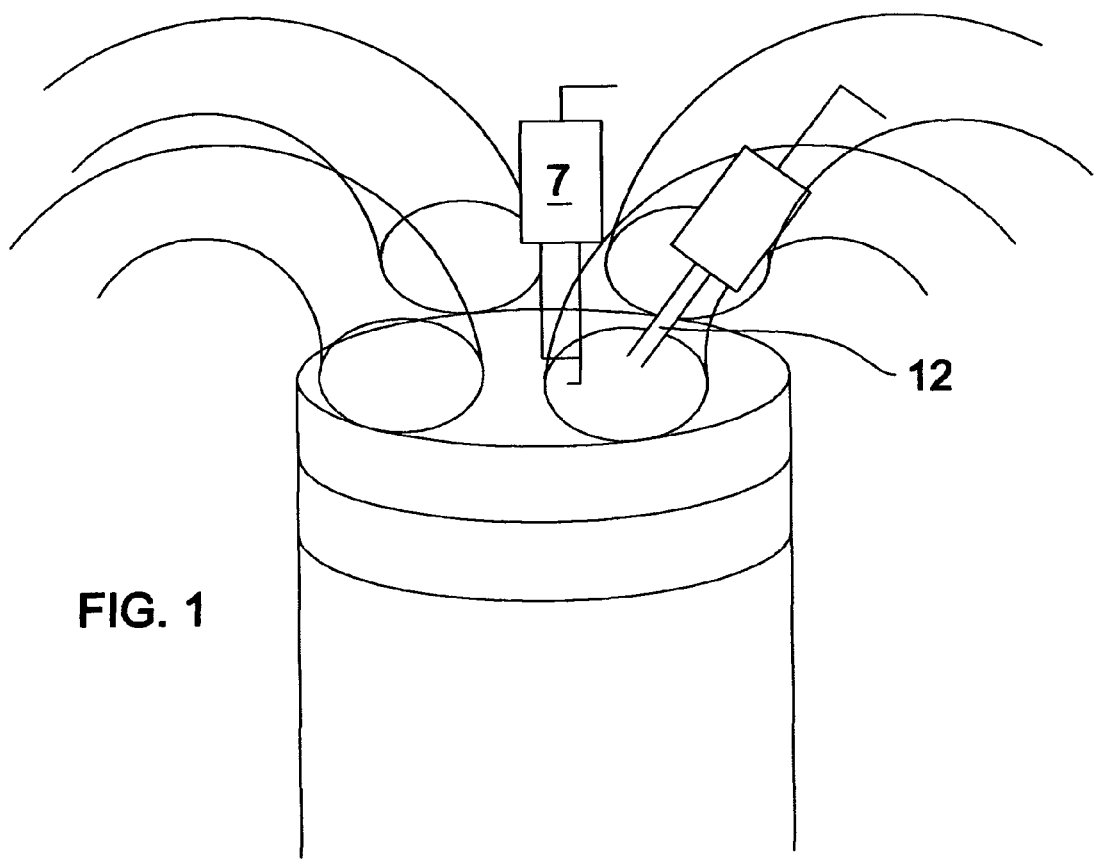
FIG. 1 is an isometric view of the heading gas injection system (HGIS) direct injection system constructed in accordance with the principles of the present invention.
Figure 3:
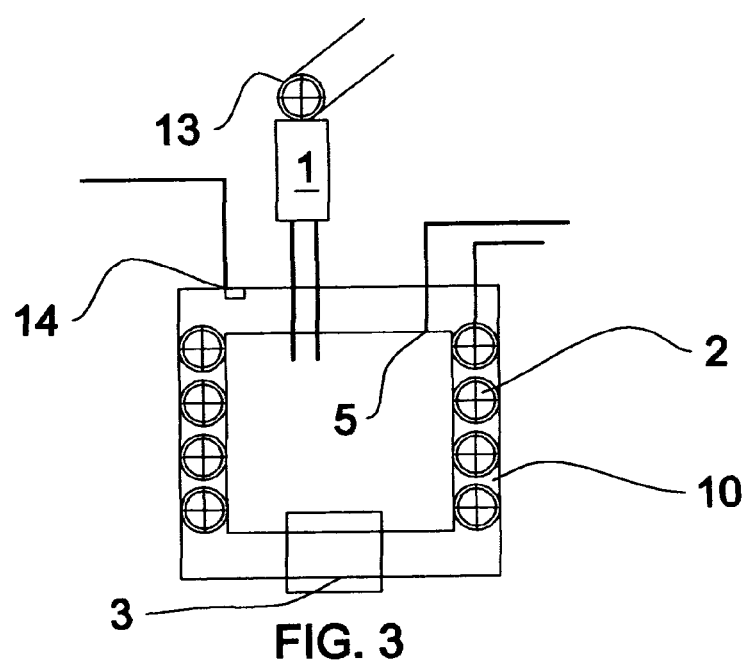
FIG. 3 is a cross-sectional view of the HGIS direct injection system of the present invention.
Figure 2:
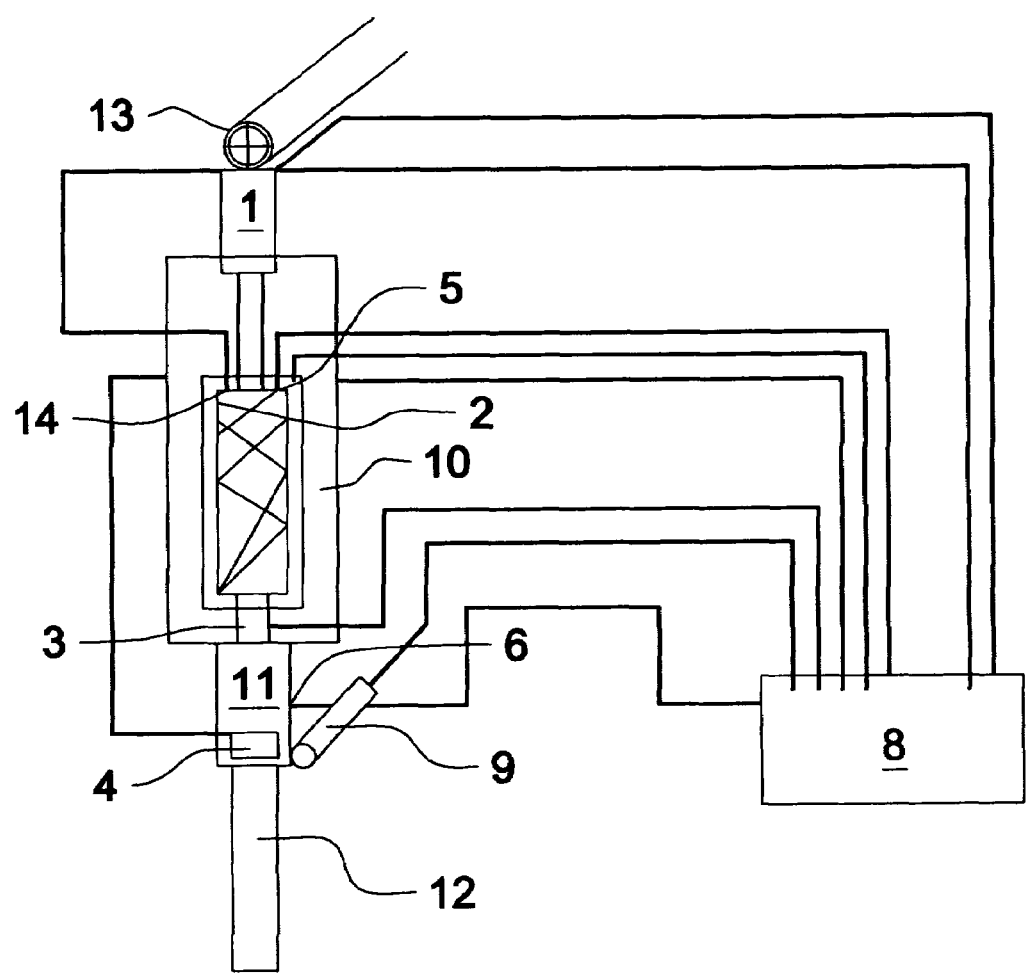
FIG. 2 is a cross-sectional view of the HGIS direct injection system of the present invention.

This invention is a device, which enables the gasification of a water-fuel mixture and a direct injection into the combustion chamber of a combustion engine of every kind.

This device consists of a closed heating element (10) with a fuel injection nozzle (1) and a electromagnetic valve (3), a temperature probe (5), a flow meter (6) and a inlet valve (4) which is controlled electronically by a magnet valve or mechanically by a servomotor (9). This device is regulated and controlled by a computerized control unit (8). This inventions task is the creation of a device capable of atomizing a water-fuel mixture and transporting it with high pressure directly into the combustion chamber of a spark-ignition internal combusting engine of all kinds like Otto-motor, Dieselmotor, Wankelmotor and turbines of every design. This task is solved by means of using a water-fuel mixture forming a solution, which goes though the injection nozzle (1) into the heating element (10), having electrical heating diodes (2) controlled by a so called control unit (8) also responsible for controlling and injecting. The within this heating element (10) atomized fuel now reaches the electromagnetic valve (3), which locks or unlocks the heating element (2) in direction of the inlet valve (4) of this device.

This inlet valve (4) is connected with the control unit (8) of the combustion engine and is perfectly coordinated resulting in optimal inlet times, as well as inlet flow rates meaning an ideal operation of the spark-ignition internal combustion engine. This carried out by the flow meter (6) within the inlet channel (11). The inlet valve (4) can either be controlled by computer controlled electromagnetic valve (4), or computer controlled mechanically by a servomotor (9), which is responsible for opening and closing the inlet nozzle (12) which is part of the device within a fraction of seconds. The injection beam of the atomized fuel is pointed at the high performance spark plug (7) with an amplified ignition spark. Therefore an ideal usage of fuel as well as an optimal explosion and combustion is given. This means less fuel consumption, less pollutants and by use of water-fuel mixture, which might be methanol-water or ethanol-water originating from the biomass, the production of pollutants is not given any longer. This invention has the clear advantage, that every single water-fuel mixture and fuel can be atomized within this heating element (10), therefore guarantying an environment-friendly operation of a spark ignition internal combusting engine. As well as the consumption, the performance becomes optimized, which of course represents an important impact on the efficiency.

In the drawing shows one execute mode of the invention. The fuel mixture reaches the fuel injection nozzle (1) through the fuel distributor (13). By means of the fuel reaches the heating element (10). This heating element (10) is located within a closed chamber, which is equipped with electrical heating resistors (diodes) (2), equipped with a fuel injection nozzle (1), a electromagnetic valve (3) and a temperature probe (5) responsible for assuring, that the temperature is within the area of 200° and up to 1000° Celsius. With the control unit (8), which also has access to the Pressure gauge (14), the temperature and the pressure are controlled and regulated. The within this heating element (10) atomized fuel-mixture now reaches the chamber to the inlet channel (11), where the flow meter (6) is located by the electromagnetic valve (3). The computer controlled inlet valve (4) takes care for an optimal fuel amount due to controlled inlet times. This inlet amount is further controlled by the flow meter (6) in the inlet channel (11). The inlet valve (4) can be activated either by a computer controlled electromagnetic valve (3) or an also computer controlled servomotor (9). Through this inlet nozzle (12) the atomized fuel now reaches the combustion chamber, where the injection beam directly hits the spark plug (7). By directly injecting the atomized fuel, it is taken care, that the combustion of the mixture reaches a maximum of efficiency possible thanks the high performance spark plug (7). A new generation of engines is born. Without pollutants and ideal consumption with regards to power.

Legend:
1. fuel injection nozzle
2. electrical heating resistors (diodes)
3. electromagnetic valve
4. inlet valve
5. temperature probe
6. flow meter
7. high performance spark plug
8. control unit
9. servomotor
10. heating element
11. inlet channel
12. inlet nozzle

The invention claimed is:
1. A heading gas injection system (HGIS) direct injection system for atomizing water-fuel mixtures with a direct combustion chamber injection system for mixture for spark-ignition internal combustion engines, said HGIS direct injection system compressing:
   a fuel injection nozzle for injecting a water-fuel mixture;
   a heating element having electrical heating resistors, said fuel injection nozzle being attachable to said heating element thereby allowing said water-fuel mixture to be injected therein;
   a temperature probe for controlling and measuring said heating element, said temperature probe being attachable to said heating element;
   a pressure gauge attachable to said heating element;
   an electromagnetic valve attachable to said heating element, said electromagnetic valve being in communication with said water-fuel mixture in said heating element;
   an inlet channel attachable to said electromagnetic valve;
   a flow meter attachable to said inlet channel;
   an inlet valve attachable to said inlet channel, said inlet valve being actuated by a servomotor;
   an inlet nozzle attachable to said inlet valve and to a combustion chamber including a spark plug; and
   a control unit.

2. The (HGIS) direct injection system of claim 1, wherein said heating resistors of said heating element are located in the interior of said heating element.

3. The (HGIS) direct injection system of claim 1, wherein said system is coordinated in a way to use fuel of every kind without water.

4. The (HGIS) direct injection system of claim 1, wherein said heating element is regulated to reach temperatures beginning with 40∞ Celsius up to 200∞ Celsius by way of said heating element being controlled by said temperature probe and said control unit.

5. The (HGIS) direct injection system of claim 1, wherein said (HGIS) direct injection system being made from any material selected from the group consisting of high-grad steel, steel, every kind of metal based alloys of light metal, ceramics, and celizium.

6. The (HGIS) direct injection system of claim 1, wherein said (HGIS) direct injection system is adapted to operate with natural gas by way of programming the required data into said control unit and said flow meter, and by controlling the flow of gas through said inlet valve.

7. The (HGIS) direct injection system of claim 1, wherein said heating resistors of said heating element are diodes.

8. The (HGIS) direct injection system of claim 1, wherein said inlet nozzle is removable.

* * * * *